(12) United States Patent
Inao et al.

(10) Patent No.: US 9,793,695 B2
(45) Date of Patent: Oct. 17, 2017

(54) EXTERIOR MEMBER AND WIRE HARNESS

(71) Applicants: YAZAKI CORPORATION, Minato-ku, Tokyo (JP); TOYOTA JIDOSHA KABUSHIKI KAISHA, Toyota-shi, Aichi-ken (JP)

(72) Inventors: Shinichi Inao, Makinohara (JP); Hideomi Adachi, Makinohara (JP); Yoshiyuki Ishihara, Toyota (JP)

(73) Assignees: YAZAKI CORPORATION, Tokyo (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 15/241,789

(22) Filed: Aug. 19, 2016

(65) Prior Publication Data
US 2017/0053722 A1    Feb. 23, 2017

(30) Foreign Application Priority Data
Aug. 20, 2015    (JP) .................. 2015-162377

(51) Int. Cl.
*H01B 7/17* (2006.01)
*H01B 7/00* (2006.01)
*H02G 3/04* (2006.01)
*B60R 16/02* (2006.01)
*H02G 15/007* (2006.01)

(52) U.S. Cl.
CPC ....... *H02G 3/0481* (2013.01); *B60R 16/0215* (2013.01); *H02G 3/0468* (2013.01); *H02G 15/007* (2013.01)

(58) Field of Classification Search
CPC ............................. H01B 7/17; H01B 7/0045
USPC ............................................ 174/72 A
See application file for complete search history.

(56) References Cited

U.S. PATENT DOCUMENTS 8,624,114 B2    1/2014 Oga et al.
2010/0045106 A1*   2/2010 Oga ................ B60R 16/0215
                                                   307/10.1

FOREIGN PATENT DOCUMENTS

| JP | 2003153411 | * | 5/2003 |
| JP | 2010-47032 A | | 3/2010 |
| JP | 2014103800 | * | 6/2014 |

* cited by examiner

*Primary Examiner* — Timothy Thompson
*Assistant Examiner* — Charles Pizzuto
(74) *Attorney, Agent, or Firm* — Sughrue Mion, PLLC

(57) ABSTRACT

An exterior member having a tubular form which accommodates and protects a conductive path, the exterior member includes at least one conductive path holding part which holds the conductive path. The at least one conductive path holding part is configured in a protruding part in an inner surface of the tube, and in a recessed part in an outer surface of the tube. In the recessed part, one or a plurality of protrusions are formed which protrude outward. The protrusions are configured in forms having elasticity.

7 Claims, 9 Drawing Sheets

EXTERIOR MEMBER AND WIRE HARNESS

CROSS REFERENCE TO RELATED APPLICATION

This application is based on Japanese Patent Application (No. 2015-162377) filed on Aug. 20, 2015, the contents of which are incorporated herein by reference. Also, all the references cited herein are incorporated as a whole.

BACKGROUND OF THE INVENTION

1. Technical Field

The present invention relates to an exterior member having a tubular form which protects a conductive path from an outside part and a wire harness including the exterior member in its structure.

2. Background Art

For instance, when a high voltage wire harness is taken as an example, in a below-described patent literature 1, a wire harness is disclosed which electrically connects together high voltage devices mounted on a hybrid motor vehicle or an electric vehicle. The wire harness disclosed in the patent literature 1 is invented by the applicant of the present invention and includes one or a plurality of conductive paths and an exterior member having a tubular form into which the one or the plurality of conductive paths are inserted to protect them. The wire harness disclosed in the patent literature 1 is a long wire harness arranged through an under-floor of the motor vehicle.

Patent Literature 1 is JP-A-2010-47032.

SUMMARY OF THE INVENTION

In the above-described usual technique, a tape is wound on the conductive path to fix the conductive path at a position of an end part in the exterior member. Further, the conductive path is inserted into the exterior member and also held by a protector at front and rear positions of the under-floor of the motor vehicle. Both to the exterior member and the protector, the conductive path is fixed with one end side and the other end side thereof separated from each other. An intermediate part of the conductive path is accommodated under a state that the conductive path is spaced from the exterior member. Under such an accommodated state, for instance, when a vibration during a driving of the motor vehicle is transmitted to the conductive path, there is a fear that the conductive path may be vibrated to abut on or strike an inner surface of the exterior member. Namely, shavings may be generated in the conductive path side.

The present invention is devised by considering the above-described circumstances, and an object thereof is to provide an exterior member which can suppress a movement of a conductive path in the exterior member and a wire harness including the exterior member in its structure.

According to a first aspect of an embodiment of the invention, there is provided an exterior member having a tubular form accommodates and protects one or a plurality of conductive paths, the exterior member includes a conductive path holding part which holds the conductive path, wherein the conductive path holding part is configured in a protruding form when viewed from an inner surface side of the tube, and in a recessed form when viewed from an outer surface side of the tube, and in the part of the recessed form, one or a plurality of protrusions are formed which protrude outward, and the protrusions are configured in forms having elasticity.

According to a second aspect of the embodiment of the invention, in the exterior member according to the first aspect, the protrusions are configured in annularly extending forms in plan view.

According to a third aspect of the embodiment of the invention, in the exterior member according to the first or second aspect, the part of the protruding form and the part of the recessed form are configured in forms of a circular arc in section in an axial direction of the tube and having elasticity.

According to a fourth aspect of the embodiment of the invention, in the exterior member according to the first, the second, or the third aspect, the conductive path holding part is arranged and formed in one or a plurality of prescribed positions in the axial direction of the tube and in a one-paired state so as to sandwich an axis of the tube in the prescribed positions.

According to a fifth aspect of the embodiment of the invention, the exterior member according to one of the first to fourth aspects has a straight tube part as a part in which the conductive path is arranged straight and the conductive path holding part is arranged and formed in the straight tube part.

According to a sixth aspect of the embodiment of the invention, the exterior member according to one of the first to sixth aspects is configured in a form having no split body.

Further, according to a seventh aspect of the embodiment of the invention, there is provided a wire harness including one or a plurality of conductive paths according to one of the first to the sixth aspect, and the wire harness includes an exterior member according to the first to sixth embodiment and one or a plurality of conductive paths accommodated in and protected by the exterior member.

In the first aspect, since the conductive path holding part is used which is configured in the protruding form when viewing from the inner surface side of the tube and in the recessed form when viewing from the outer surface side of the tube, and in the part of the recessed form, the protrusions are formed so as to have the elasticity, when the conductive path holding path is arranged and formed to meet a position where a movement of the conductive path needs to be suppressed, the conductive path can be prevented from flapping. Namely, the conductive path can be allowed to hardly move or held so as not to move. Accordingly, the movement of the conductive path can be effectively suppressed in a desired position of the exterior member, so that shavings in the conductive path side can be advantageously prevented.

In the second to fourth aspects, a better form can be effectively provided in which the conductive path is allowed to hardly move and held so as not to move so that the conductive path may be prevented from flapping and the conductive path can be smoothly inserted.

In the fifth aspect, since the conductive path holding part is formed in the straight tube part, the movement of the conductive path can be effectively suppressed in the desired position of the straight tube part. Thus, the movement of the conductive path can be suppressed in a long range such as an under-floor of a motor vehicle, so that the shavings in the conductive path side can be advantageously prevented.

Further, in the sixth aspect, in addition to the effects achieved in the second to fifth aspects, below-described effects can be further achieved. Namely, since the exterior member is configured in the form having no split body, water-tightness and dust prevention can be ensured. Accordingly, a bad influence to the conductive path side can be advantageously eliminated.

In the seventh aspect, since the wire harness includes the exterior member according to the first to sixth aspects, the above-described effects can be obtained as the wire harness. Accordingly, in the embodiment of the present invention, a better wire harness can be effectively provided.

BRIEF DESCRIPTION OF THE DRAWINGS

FIG. 1A is a schematic view illustrating an arranged state of a wire harness for a high voltage. FIG. 1B is a schematic view illustrating an arranged state of a wire harness for a low voltage different from FIG. 1A.

DETAILED DESCRIPTION OF THE EXEMPLARY EMBODIMENTS

Figure 1A:
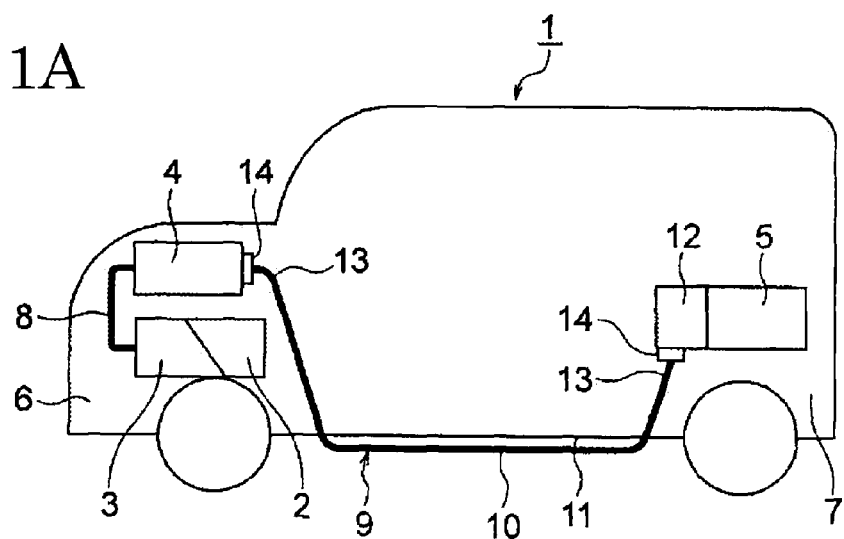
FIGS. 1A and 1B are views illustrating wire harnesses of an embodiment of the present invention.

A wire harness includes an exterior member having a tubular form and a conductive path inserted into the exterior member. The exterior member is configured in a form having no split body. For instance, in an intermediate part of the exterior member, a conductive path holding part is arranged and formed. The conductive path holding part is configured in a form protruding when viewed from an inner surface side of the tube and recessed when viewed from an outer surface side of the tube. In the part of the recessed form, protrusions having elasticity are formed. The part of the protruding form and the part of the recessed form are configured in the forms of a circular arc in section in an axial direction of the tube and having the elasticity. The protrusions are configured in annularly extending forms in plan view, for instance, elliptic forms.

First Exemplary Embodiment

Now, by referring to the drawings, a first exemplary embodiment will be described below.

Figure 1B:
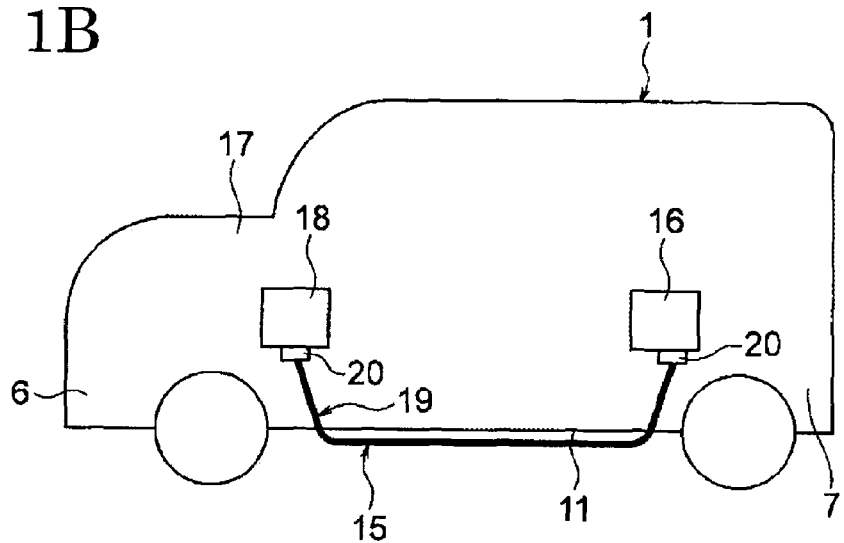
Figure 2:
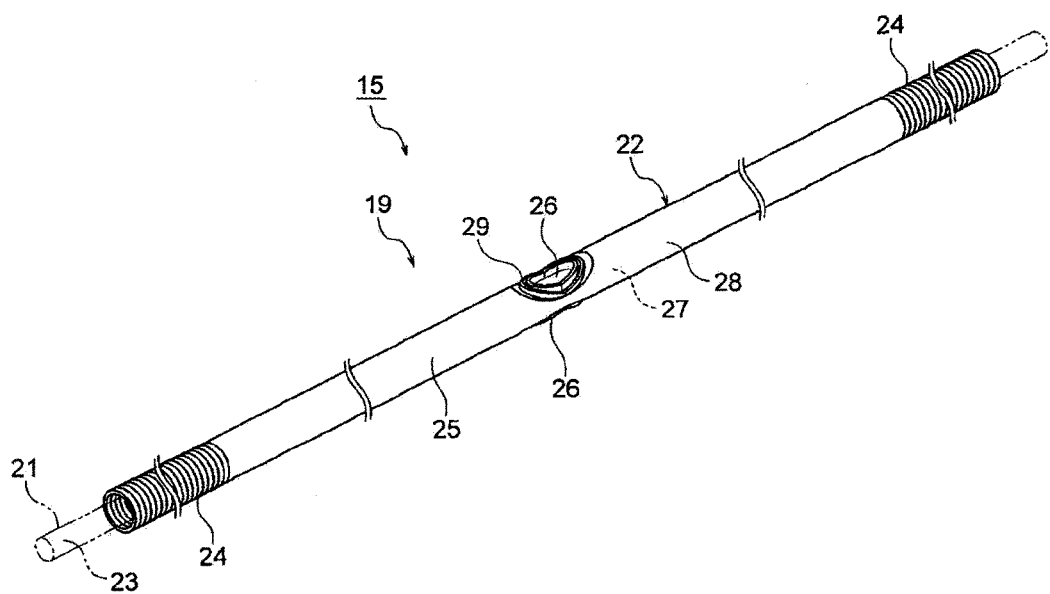
FIG. 2 is a perspective view illustrating an exterior member of the embodiment of the present invention.
Figure 3:
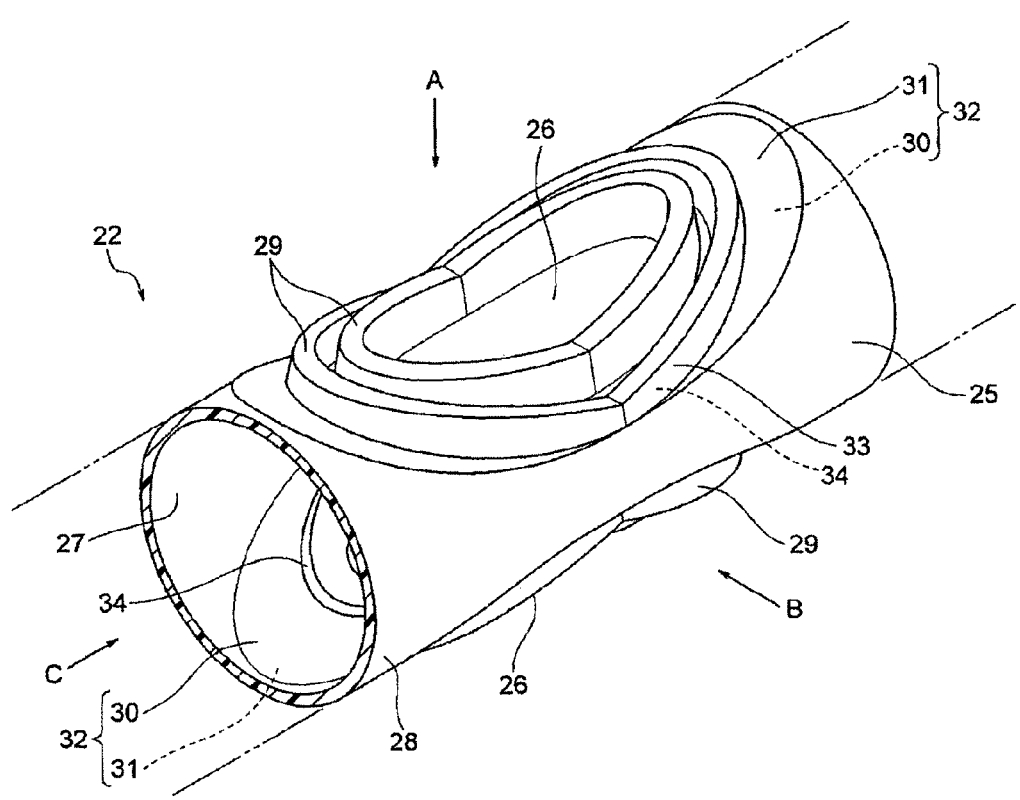
FIG. 3 is an enlarged perspective view of an electric wire holding part illustrated in FIG. 2.
Figure 4:
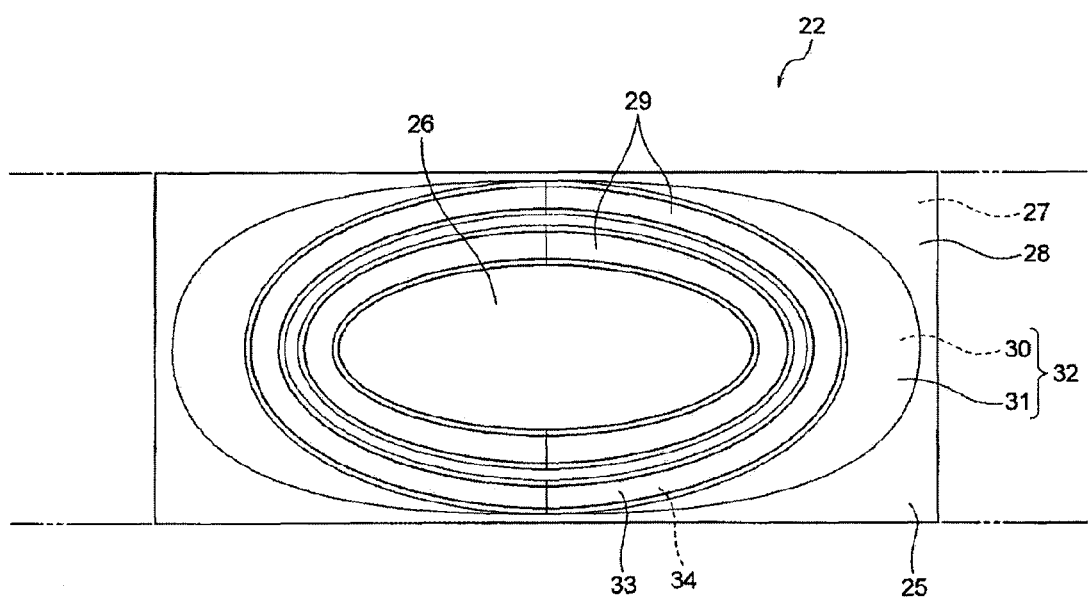
FIG. 4 is an enlarged view of the electric wire holding part viewed from a direction A in FIG. 3.
Figure 5:
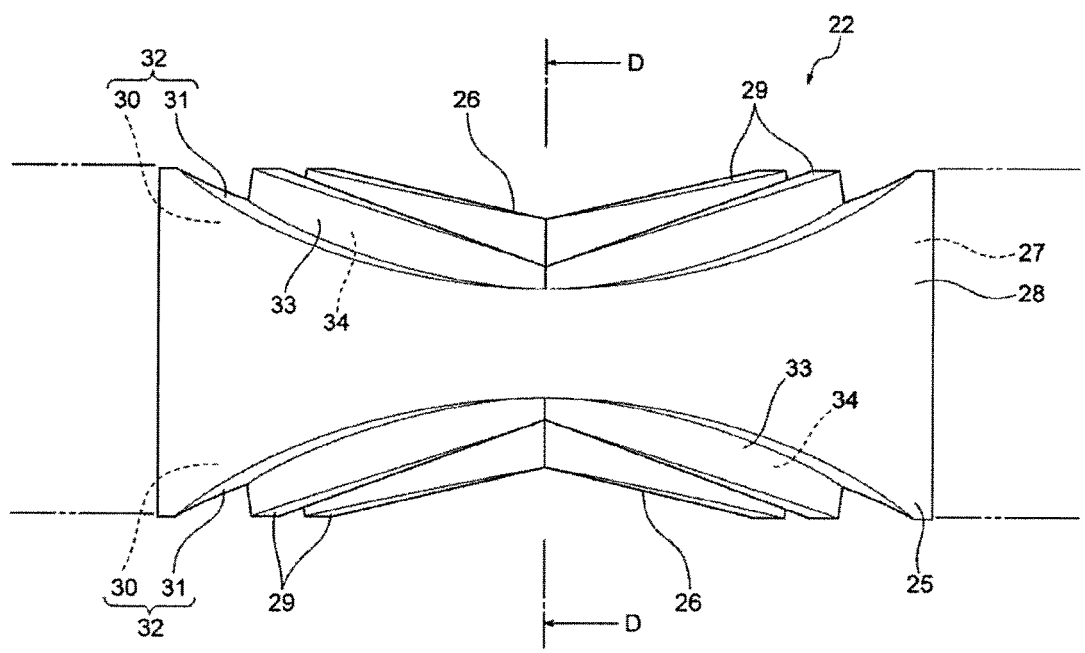
FIG. 5 is an enlarged view of the electric wire holding part viewed from a direction B in FIG. 3.
Figure 6:
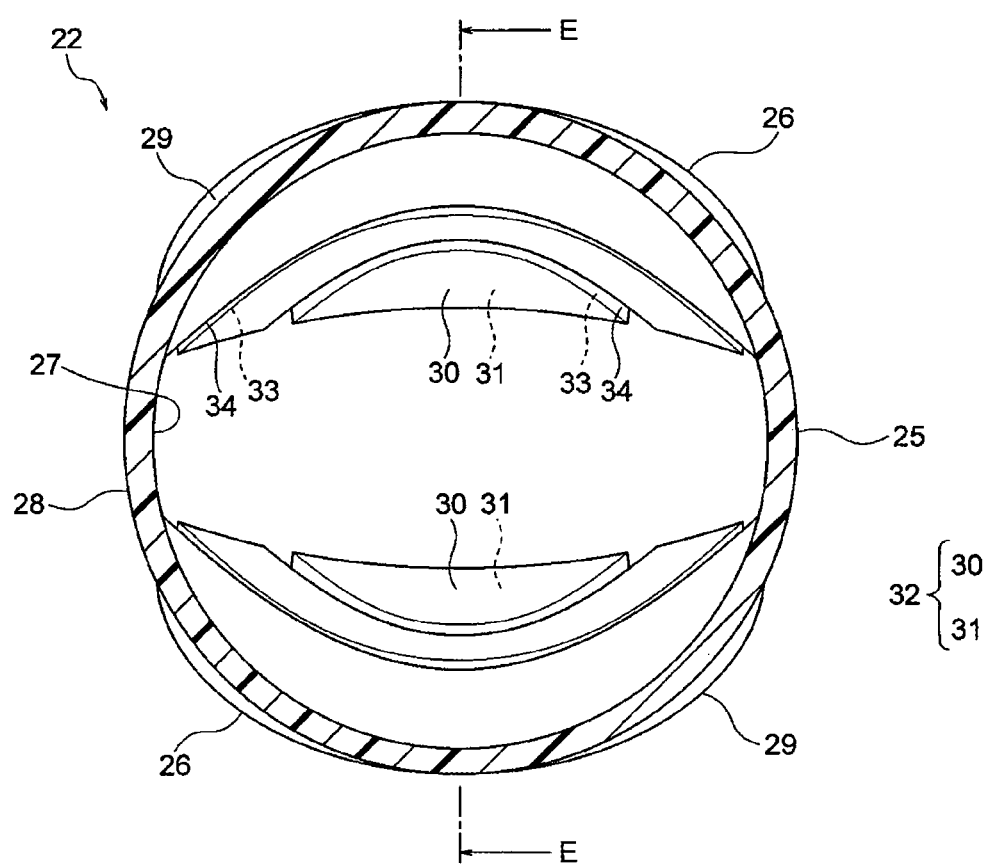
FIG. 6 is an enlarged view of the electric wire holding part viewed from a direction C in FIG. 3.
Figure 7:
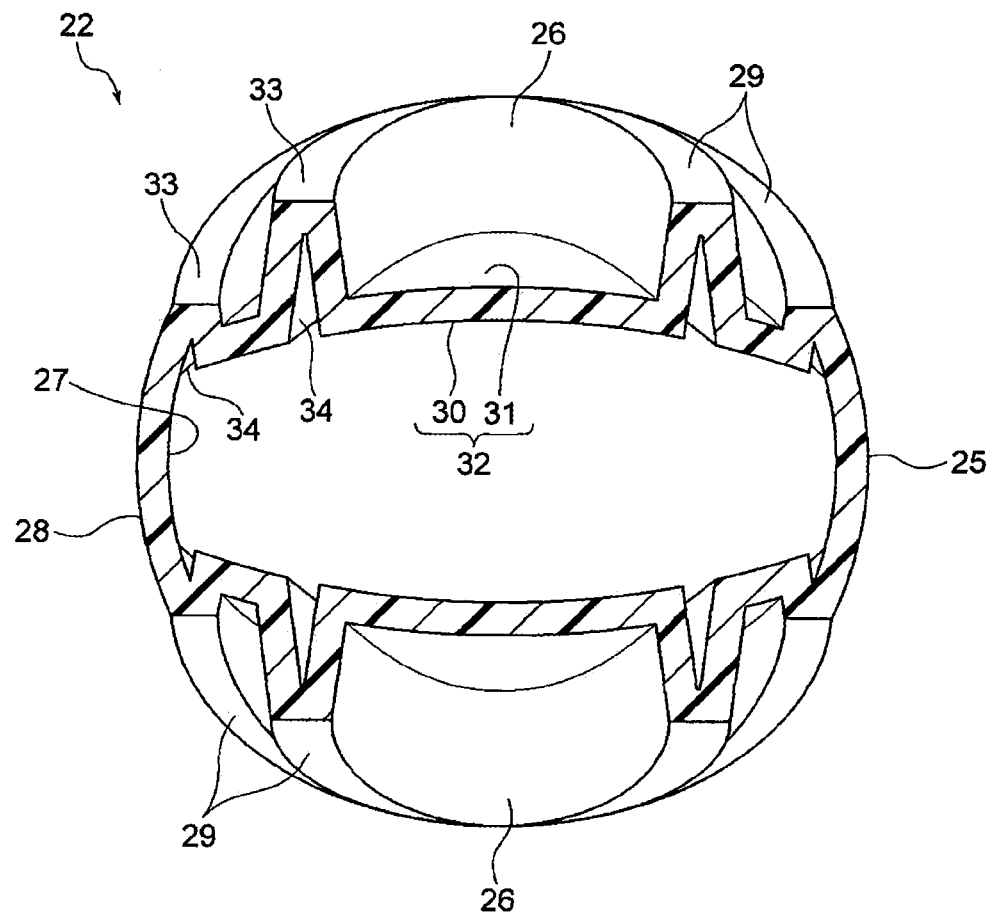
FIG. 7 is a sectional view taken along a line D-D in FIG. 5.
Figure 8:
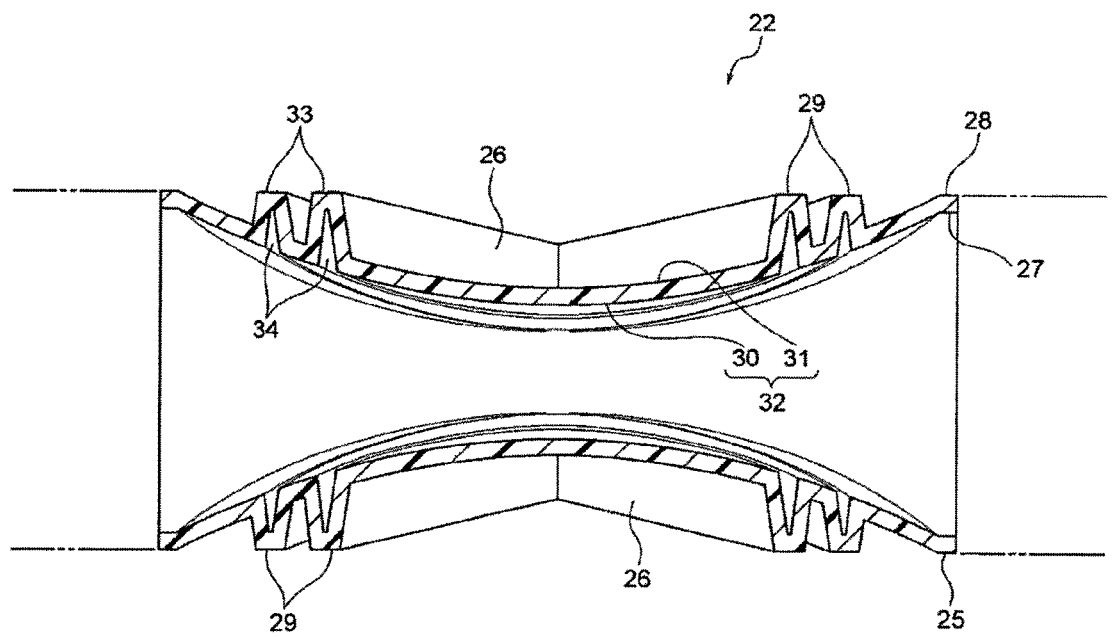
FIG. 8 is a sectional view taken along a line E-E in FIG. 6.

FIGS. 1A and 1B are views illustrating wire harnesses of the present invention. FIG. 1A is a schematic view illustrating an arranged state of a wire harness for a high voltage. FIG. 1B is a schematic view illustrating an arranged state of a wire harness for a low voltage different from FIG. 1A. Further, FIG. 2 is a perspective view illustrating an exterior member of the present invention. FIG. 3 is an enlarged perspective view of an electric wire holding part illustrated in FIG. 2. FIG. 4 to FIG. 6 illustrate enlarged views of the electric wire holding part illustrated in FIG. 3. FIG. 7 is a sectional view taken along a line D-D in FIG. 5. FIG. 8 is a sectional view taken along a line E-E in FIG. 6.

In the present exemplary embodiment, the present invention is applied to the wire harness arranged in a hybrid motor vehicle (an electric vehicle or an ordinary motor vehicle driven by an engine may be supposed to be used).

<Structure of Hybrid Motor Vehicle 1>

In FIG. 1A, reference numeral 1 designates a hybrid motor vehicle 1. The hybrid motor vehicle 1 is a vehicle driven by mixing together two powers of an engine 2 and a motor unit 3. To the motor unit 3, an electric power of a battery 5 (a battery pack) is supplied through an inverter unit 4. The engine 2, the motor unit 3 and the inverter unit 4 are mounted on an engine room 6 in a position where front wheels are provided in the present exemplary embodiment. Further, the battery 5 is mounted on a rear part 7 of the motor vehicle where rear wheels are provided (may be supposed to be mounted on an interior of the motor vehicle located in a rear part of the engine room 6).

The motor unit 3 is connected to the inverter unit 4 by a wire harness 8 for a high voltage (a motor cable for a high voltage). Further, the battery 5 is also connected to the inverter unit 4 by a wire harness 9 for a high voltage. An intermediate part 10 of the wire harness 9 is arranged in an under-floor 11 of the vehicle in the motor vehicle (in a vehicle body). Further, the intermediate part 10 is arranged substantially in parallel along the under-floor 11 of the vehicle. The under-floor 11 of the vehicle is a known body (the vehicle body) and what is called a panel member and has a through hole formed in a prescribed position. Into the through hole, the wire harness 9 is water tightly inserted.

The wire harness 9 is connected to the battery 5 through a junction block 12 provided in the battery 5. To the junction block 12, an outer connection unit such as a shield connector 14 arranged in a harness end 13 of a rear end side of the wire harness 9 is electrically connected. Further, the wire harness 9 is electrically connected to the inverter unit 4 through an outer connection unit such as a shield connector 14 arranged in a harness end 13 of a front end side.

The motor unit 3 includes a motor and a generator. Further, the inverter unit 4 includes an inverter and a converter in its structure. The motor unit 3 is formed as a motor assembly including a shield case. Further, the inverter unit 4 is also formed as an inverter assembly including a shield case. The battery 5 is an Ni-MH type or an Li-ion type and formed as a module. For instance, a storage battery such as a capacitor may be used. It is to be understood that as long as the battery 5 can be used for the hybrid motor vehicle 1 or an electric vehicle, the battery 5 is not especially limited.

In FIG. 1B, reference numeral 15 designates a wire harness. The wire harness 15 is a wire harness for a low voltage and provided to electrically connect a battery 16 for a low voltage in the rear part 7 of the vehicle in the hybrid motor vehicle 1 to an auxiliary device 18 (a device) mounted on a front part 17 of the motor vehicle. The wire harness 15 is arranged through the under-floor 11 of the vehicle like the wire harness 9 illustrated in FIG. 1A (as one example, the wire harness 15 may be supposed to be arranged through an interior side of the vehicle).

As illustrated in FIGS. 1A and 1B, in the hybrid motor vehicle 1, the wire harnesses 8 and 9 for the high voltage and the wire harness 15 for the low voltage are arranged. To the present invention, any of the wire harnesses may be applied, however, as a representative example, the wire harness 15 for the low voltage is exemplified and describe below.

<Structure of Wire Harness 15>

In FIG. 1B, the long wire harness 15 arranged through the under-floor 11 of the vehicle includes a harness main body 19 and connectors 20 (outer connection units) arranged respectively in both ends of the harness main body 19. Further, the wire harness 15 includes a fixing member (for instance, a clamp or the like) for arranging the wire harness in a prescribed position and a water stop member not illustrated in the drawing (for instance, a grommet or the like).

<Composition of Harness Main Body 19>

In FIG. 2, the harness main body 19 includes a conductive path 21 and an exterior member 22 of the present invention for accommodating and protecting the conductive path 21. The number of the conductive path 21 in the drawing is one in the present exemplary embodiment, however, this is supposed to be one example. Further, as for a composition and a structure of the exterior member 22, a composition and a structure may be used in which the wire harness 9 for the high voltage may be accommodated and protected together. Initially, a composition and a structure of the conductive path 21 in the harness main body 19 will be described below. Subsequently, a composition and a structure of the exterior member 22 of the present invention will be described below.

<Composition and Structure of Conductive Path 21>

The conductive path 21 is formed with an electrically conductive conductor and an insulating insulator which covers the conductor. The conductor is configured in a circular form in section by copper or copper alloy, or aluminum or aluminum alloy. As for the conductor, may be used either a conductor structure formed by twisting element wires or a rod shaped conductor structure having a rectangular form or a circular form (a round form) in section (for instance, a conductor structure having a straight angle single core or a round single core, and in this case, an electric wire itself is also rod shaped). In such a conductor, the insulator formed with an insulating resin material is extrusion molded on an outer surface thereof.

The insulator is extrusion molded on an outer peripheral surface of the conductor by using a thermoplastic resin material. The insulator is configured as a coating having a circular form in section. The insulator is formed with a prescribed thickness. As the thermoplastic resin, various kinds of known thermoplastic resins may be used. The thermoplastic resin material may be suitably selected from high polymer materials such as a polyvinyl chloride resin, a polyethylene resin, a polypropylene resin or the like.

Reference numeral 23 in the conductive path 21 designates an outer peripheral surface. In the present exemplary embodiment, an outer peripheral surface of the insulator corresponds to the outer peripheral surface 23. Further, for instance, in the wire harness 9 (see FIG. 1A), an outer peripheral surface of a sheath or a shield member (a braided member, a metal foil or the like) corresponds thereto.

<Composition and Structure of Exterior Member 22 of the Present Invention>

The exterior member 22 is configured in one straight tubular form by a resin molding (Before the exterior member is used, the exterior member is straight. The exterior member is not necessarily formed with a resin, but may be formed with metal). Further, the exterior member 22 is configured in a form having no split body. In other words, the exterior member 22 is configured in a form having no slit (configured in the form except a split tube).

Such an exterior member 22 includes a flexible tube part 24 having flexibility and a straight tube part 25 as a part which arranges the conductive path 21 straight. A plurality of flexible tube parts 24 and straight tube parts 25 are formed. Further, these flexible tube parts and straight tube parts are alternately arranged and formed.

The flexible tube part 24 is arranged so as to meet a vehicle attaching configuration (a configuration of a part in which the wire harness is arranged, a configuration of an object to be fixed). Further, the flexible tube part 24 is also formed with such a length as to meet the vehicle attaching configuration. Lengths of the flexible tube parts 24 are not fixed and respectively formed with necessary lengths so as to meet the vehicle attaching configuration. Such flexible tube parts 24 are respectively formed so as to be bent at desired angles under a packed state of the wire harness 15 or during its transportation or during an arrangement of a path to the vehicle. Namely, the flexible tube parts 24 can be bent to be formed in bent configurations, and further, as a matter of course, the flexible tube parts 24 are formed so that the flexible tube parts may be returned to original straight states (states during the resin molding) as illustrated in the drawing.

In the present exemplary embodiment, the flexible tube parts 24 are formed in bellows tube configurations (as long as the flexible tube parts 24 have the flexibility, the configurations thereof are not especially limited). Specifically, the flexible tube parts 24 have bellows protruding parts and bellows recessed parts in a circumferential direction. The bellows recessed parts and the bellows protruding parts are formed so as to be alternately continuous in an axial direction of the tube (in a direction where the exterior member 22 illustrated in FIG. 2 is extended).

The straight tube parts 25 are formed as parts which do not have the flexibility like that of the flexible tube parts 24. The straight tube parts 25 are also formed as parts which are not bent (the parts which are not bent mean parts to which the flexibility is not positively applied) under a packed state, or during transportation, or during an arrangement of a path. The straight tube part 25 in the drawing is formed in a configuration of a long straight tube.

The straight tube part 25 is formed in a rigid part, as compared with the flexible tube part 24. The straight tube part 25 is formed in such a position or a length as to meet the vehicle attaching configuration. In the present exemplary embodiment, the straight tube part 25 is formed at least as a part arranged in the under-floor 11 (see FIGS. 1A and 1B) of the vehicle. At a prescribed position (at one or a plurality of prescribed positions in the axial direction of the tube in the straight tube part 25) as an intermediate part of the straight tube part 25, conductive path holding parts 26 which constitute a characteristic part of the present invention are arranged in a state of one pair so as to sandwich the axis of the tube between them. The one pair of conductive path holding parts 26 are formed integrally with the straight tube part 25.

<Conductive Path Holding Part 26 as Characteristic Part of the Present Invention>

In FIG. 2 to FIG. 8, the conductive path holding part 26 is a part which allows the conductive path 21 to hardly move so as to prevent the conductive path 21 from flapping or hold the conductive path 21 so as not to move the conductive path 21, and is configured in a protruding form when viewing from an inner surface 27 side of the tube and configured in a recessed form when viewing from an outer surface 28 side of the tube. Further, the conductive path 26 is configured in a form provided with a plurality of protrusions 29 protruding outward in the part of the recessed form. In other words, the conductive path holding part 26 is configured in a form which has a constriction part 32 in which a protruding part 30 is formed in the inner surface 27 side of the tube and a recessed part 31 is formed in the outer surface 28 side of the tube and a plurality of protrusions 29 protruding outward from the recessed part 31 of the constriction part 32.

The constriction part 32 (the protruding part 30 and the recessed part 31) is configured in a form of a circular arc in section in the axial direction of the tube (the constriction part 32 may have what is called a "constricted form"). Further, the constriction part 32 is configured in such a way that the part of the protruding part 30 has a smooth surface (a form may be supposed to be provided in which the conductive path 21 is inserted without difficulty).

The conductive path holding part 26 of the present exemplary embodiment is, as described above, formed and arranged in the state of one pair so as to sandwich the axis of the tube between them. A direction that the axis of the tube is sandwiched between the conductive path holding parts 26 corresponds to a direction in which the flapping of the conductive path 21 is generated, namely, a vibrating direction or a vertical direction (however, the direction is not limited to the above-described directions). The one pair of conductive path holding parts 26 are arranged and formed so as to sandwich and hold the conductive path 21 between them. Further, the one pair of conductive path holding parts 26 are arranged and formed so that the conductive path 21 may be floated in front and rear parts of that part.

The one pair of electrically conductive part holding parts 26 are arranged and formed in positional relations that surfaces of the protruding parts 30 respectively come into contact with the outer peripheral surface 23 of the conductive path 21 or press the outer peripheral surface 23 of the conductive path 21. The one pair of conductive path holding parts 26 are formed so as to be bent in such a way that the protruding parts 30 may be respectively separated from each other. Namely, the one pair of conductive path holding parts 26 are formed so as to have elasticity. In the present invention, the elasticity is adjusted mainly depending on forms or the number of the protrusions 29.

The protrusions 29 are configured in forms so as to have the elasticity in themselves. Specifically, the protrusions 29 are configured so as to have protruding forms 33 in section when viewed from the outer surface 28 side of the tube and recessed forms 34 in section when viewed from the inner surface 27 side of the tube. Further, the protrusions 29 are configured in annularly extending forms so as to have elliptic forms in plan view (see FIG. 4). In other words, the protrusions 29 are formed in the parts which have the same forms as the bellows recessed parts and the bellows protruding parts in the flexible tube part 24 illustrated in FIG. 2 and which have the elliptic forms.

The protrusions 29 in the present exemplary embodiment are configured in the elliptic forms, however, the configurations of the protrusions 29 are not necessarily limited to the elliptic forms. Namely, the protrusions may be configured in polygonal forms including rectangular forms, oval forms or star forms. Further, the number of the protrusions 29 is not limited to two and may be set to one or three or more.

The protrusions 29 have the elasticity in themselves and function as parts which adjust the elasticity to the constriction part 32. Accordingly, the protrusions 29 in the present exemplary embodiment are configured as parts which improve rigidity as in what is called a rib.

The exterior member 22 is resin molded by a known extrusion molding machine which is not especially illustrated in the drawing. The part of the electric wire holding part 26 is formed by using a die having a plurality of protruding parts and recessed parts in an inner surface of the die. Specifically, a tubular extruded product extruded in a tubular form from a nozzle of the extrusion molding machine are pressed to the plurality of protruding parts and recessed parts of the die or sucked in a vacuum to obtain the forms illustrated in the drawings.

<Operation of the Present Invention>

In the above-described composition and structure, when the conductive path 21 is inserted from an opening in one end side of the exterior member 22 to an opening in the other end side, the conductive path 21 is moved under a state that the conductive path 21 is sandwiched by the one pair of conductive path holding parts 26 in the part where the one pair of conductive path holding parts 26 are formed. Then, when the conductive path 21 is completely accommodated in and protected by the exterior member 22, the conductive path 21 is held by the one pair of conductive path holding parts 26 so as to prevent the conductive path 21 from flapping. Namely, the conductive path 21 is held under a state that the conductive path 21 is hardly moved or the conductive path 21 is not moved.

<Summary and Effect of the Present Embodiment>

As described above by referring to FIG. 1A to FIG. 8, the wire harness 15 includes the exterior member 22 having the tubular form and the conductive path 21 inserted into the exterior member 22. The exterior member 22 is configured in the form having no split body. In the intermediate part (the straight tube part 25) of the exterior member 22, the conductive path holding parts 26 are arranged and formed in the state of one pair so as to hold the axis of the tube between them. The conductive path holding part 26 is configured in the form protruding when viewing from the inner surface 27 side of the tube and recessed when viewing from the outer surface 28 side. In the part of the recessed form, the protrusions 29 having the elliptic forms and the elasticity are integrally formed.

Accordingly, in the present invention, since the one pair of conductive path holding parts 26 are used, the conductive path 21 can be held so as not to move. Namely, according to the present invention, the movement of the conductive path 21 can be suppressed in a desired position in the exterior member 22. Thus, shavings (of the insulator, the sheath or the shield member) in the conductive path 21 side can be effectively prevented.

Further, in the present invention, since the one pair of conductive path holding parts 26 are formed in the straight tube part 25, the movement of the conductive path 21 can be effectively suppressed in the desired position of the straight tube part 25. Thus, the movement of the conductive path 21 can be suppressed in a long range such as the under-floor 11 of the motor vehicle, so that the shavings in the conductive path 21 side can be advantageously prevented like the above-described effects.

In the present exemplary embodiment, the one pair of conductive path holding parts 26 are formed in the intermediate part of the straight tube part 25. However, the present invention is not limited thereto and the conductive path holding parts may be arranged and formed in, for instance, an intermediate part of the flexible tube part 24 under a state illustrated in FIG. 3 to FIG. 8, or arranged and formed in an end part of the exterior member 22 or in the vicinity of the end part. Further, the conductive path holding parts may be arranged and formed in both the straight tube part 25 and the flexible tube part 24.

Further, according to the present invention, since the exterior member 22 is configured in the form having no split body, water-tightness and dust prevention can be ensured. Accordingly, a bad influence to the conductive path 21 side can be advantageously eliminated.

Second Exemplary Embodiment

Figure 9:
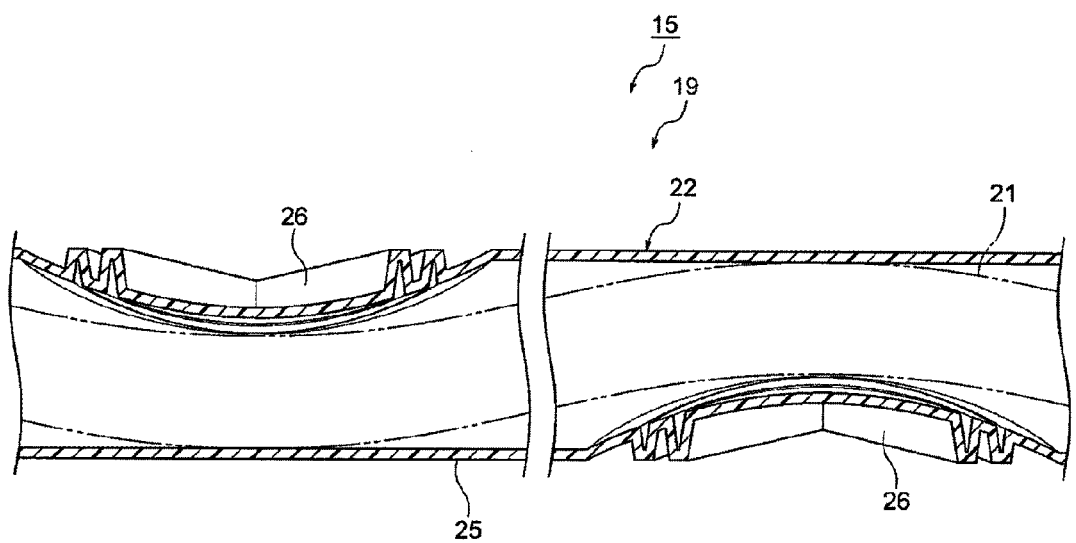
FIG. 9 is a sectional view of main parts of an exterior member as another exemplary embodiment of the present invention.

Now, referring to the drawing, a second exemplary embodiment will be described below. FIG. 9 is a sectional view of main parts of an exterior member of another exemplary embodiment. Component members which are basically the same as those of the above-described first exemplary embodiment are designated by the same reference numerals and a detailed explanation thereof will be omitted.

In FIG. 9, in an exterior member 22 of the second exemplary embodiment, conductive path holding parts 26 are arranged and formed in a zigzag manner in prescribed positions of a straight tube part 25. It is to be understood that even when the conductive path holding parts 26 are arranged and formed in such a zigzag manner, the same effects as those of the first exemplary embodiment can be obtained. Namely, the movement of a conductive path 21 can be effectively suppressed by the conductive path holding parts 26, so that shavings in the conductive path 21 side can be prevented.

In addition thereto, it is to be understood that various changes may be made within a scope that does not change the gist of the present invention.

What is claimed is:

1. An exterior member having a tubular form which accommodates and protects a conductive path, the exterior member comprising
    at least one conductive path holding part which holds the conductive path, wherein
    the at least one conductive path holding part is configured to have a protruding part in an inner surface of the tube and a recessed part in an outer surface of the tube, in the recessed part, one or a plurality of protrusions are formed which protrude outward, and
    the protrusions are configured in forms having elasticity.

2. The exterior member according to claim 1, wherein each of the protrusions is configured in an annularly extending form in plan view.

3. The exterior member according to claim 1, wherein the protruding part and the recessed part are configured in forms of a circular arc in section in an axial direction of the tube and having elasticity.

4. The exterior member according to claim 1, wherein
    the at least one conductive path holding part comprises a plurality of conductive path holding parts,
    the plurality of conductive path holding parts are arranged and formed in one or a plurality of prescribed positions in an axial direction of the tube and in a one-paired state so as to sandwich the axis of the tube in the prescribed positions.

5. The exterior member according to claim 1, further comprising
    a straight tube part as a part in which the conductive path is arranged straight, wherein
    the at least one conductive path holding part is arranged and formed in the straight tube part.

6. The exterior member according to claim 1, wherein the exterior member is configured to have a form with no split body.

7. A wire harness comprising:
    an exterior member according to claim 1; and
    one or a plurality of conductive paths accommodated in and protected by the exterior member.

* * * * *